(12) United States Patent
Kawahara et al.

(10) Patent No.: US 8,117,031 B2
(45) Date of Patent: Feb. 14, 2012

(54) VOICE PROCESSING APPARATUS AND PROGRAM

(75) Inventors: Takehiko Kawahara, Hamamatsu (JP); Yasuo Yoshioka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1056 days.

(21) Appl. No.: 11/961,580

(22) Filed: Dec. 20, 2007

(65) Prior Publication Data

US 2008/0154597 A1 Jun. 26, 2008

(30) Foreign Application Priority Data

Dec. 26, 2006 (JP) .................................. 2006-349210

(51) Int. Cl.
*G10L 17/00* (2006.01)
(52) U.S. Cl. .......................... 704/246; 704/206; 704/247
(58) Field of Classification Search .................. 704/243, 704/246, 247, 206
See application file for complete search history.

(56) References Cited

U.S. PATENT DOCUMENTS

| | | | | |
|---|---|---|---|---|
| 4,694,493 A | * | 9/1987 | Sakoe | 704/247 |
| 4,716,593 A | * | 12/1987 | Hirai et al. | 704/247 |
| 4,720,863 A | * | 1/1988 | Li et al. | 704/247 |
| 5,095,508 A | * | 3/1992 | Fujimoto | 704/247 |
| 5,583,961 A | * | 12/1996 | Pawlewski et al. | 704/241 |
| 6,249,760 B1 | | 6/2001 | Bossemeyer, Jr. | |

FOREIGN PATENT DOCUMENTS

| | | |
|---|---|---|
| EP | 1001407 | 1/2001 |
| GB | 2346001 | 7/2000 |
| JP | 2000-155600 | 6/2000 |
| JP | 2004-271596 | 9/2004 |
| JP | 2006-113439 | 4/2006 |

OTHER PUBLICATIONS

Tomoko Matsui, Article entitled: "Speaker Recognition using HMM", Technical report of IEICE, The Institute of Electronics, Information and Communication Engineers (IEICE), Jan. 1996, SP 95-111, pp. 17 to 24.

Shoji Hayakawa et al., Article entitled: "Speaker recognition using individual information in harmonic structure of linear predictive residual spectrum" Journal of IEICE, The Institute of Electronics, Information and Communication Engineers (IEICE), Sep. 1997, A vol. J80-1 No. 9, pp. 1360 to 1367. English translation of Abstract attached.

Michiko Kazama, Mikio Tohyama and Yoshio Yamasaki, Article entitled: "Talker Identification using Narrow-band Envelope Correlation Matrix", published at The Institute of Electronics, Information and Communication Engineers (IEICE), in Mar. 2002.

Notification of Reasons for Rejection for Japanese Patent Application No. 2006-349210, mailed Nov. 25, 2008 (6 pages).

\* cited by examiner

*Primary Examiner* — Talivaldis Ivars Smits
*Assistant Examiner* — Shaun Roberts
(74) *Attorney, Agent, or Firm* — Morrison & Foerster LLP

(57) ABSTRACT

A voice processing apparatus has a storage device that stores registration information containing a characteristic parameter of a given voice. The voice processing apparatus is further provided with a judgment unit, a management unit and a notification unit. The judgment unit judges whether an input voice is appropriate or not for creating or updating the registration information based on a degree of a difference between an inter-band correlation matrix of an input voice acquired this time and an inter-band correlation matrix of another input voice that is judged as being appropriate last time. The management unit creates or updates the registration information based on a characteristic parameter of the input voice when the judgment unit judges that the input voice is appropriate. The notification unit notifies a speaker of the input voice when the judgment unit judges that the input voice is inappropriate.

6 Claims, 7 Drawing Sheets

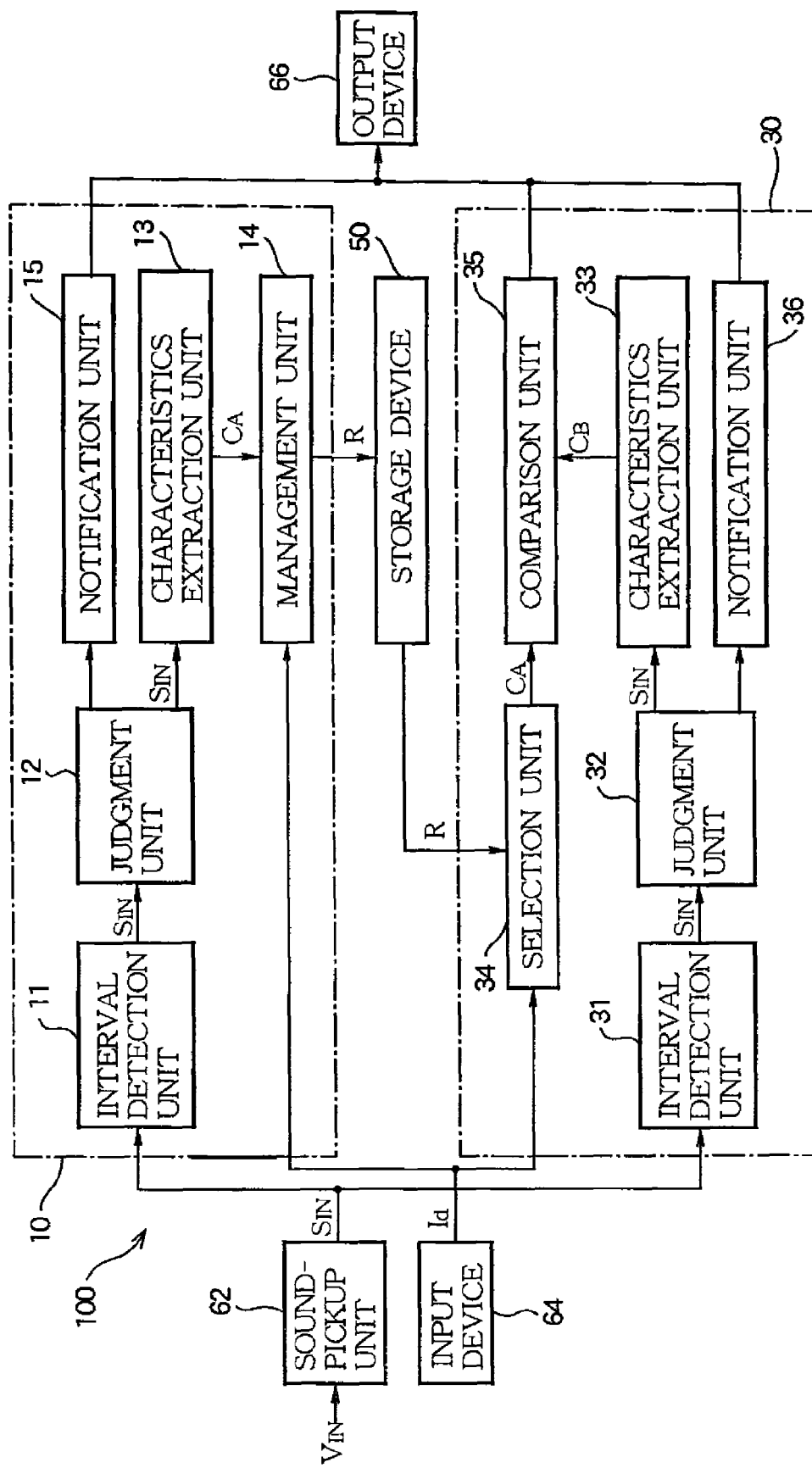

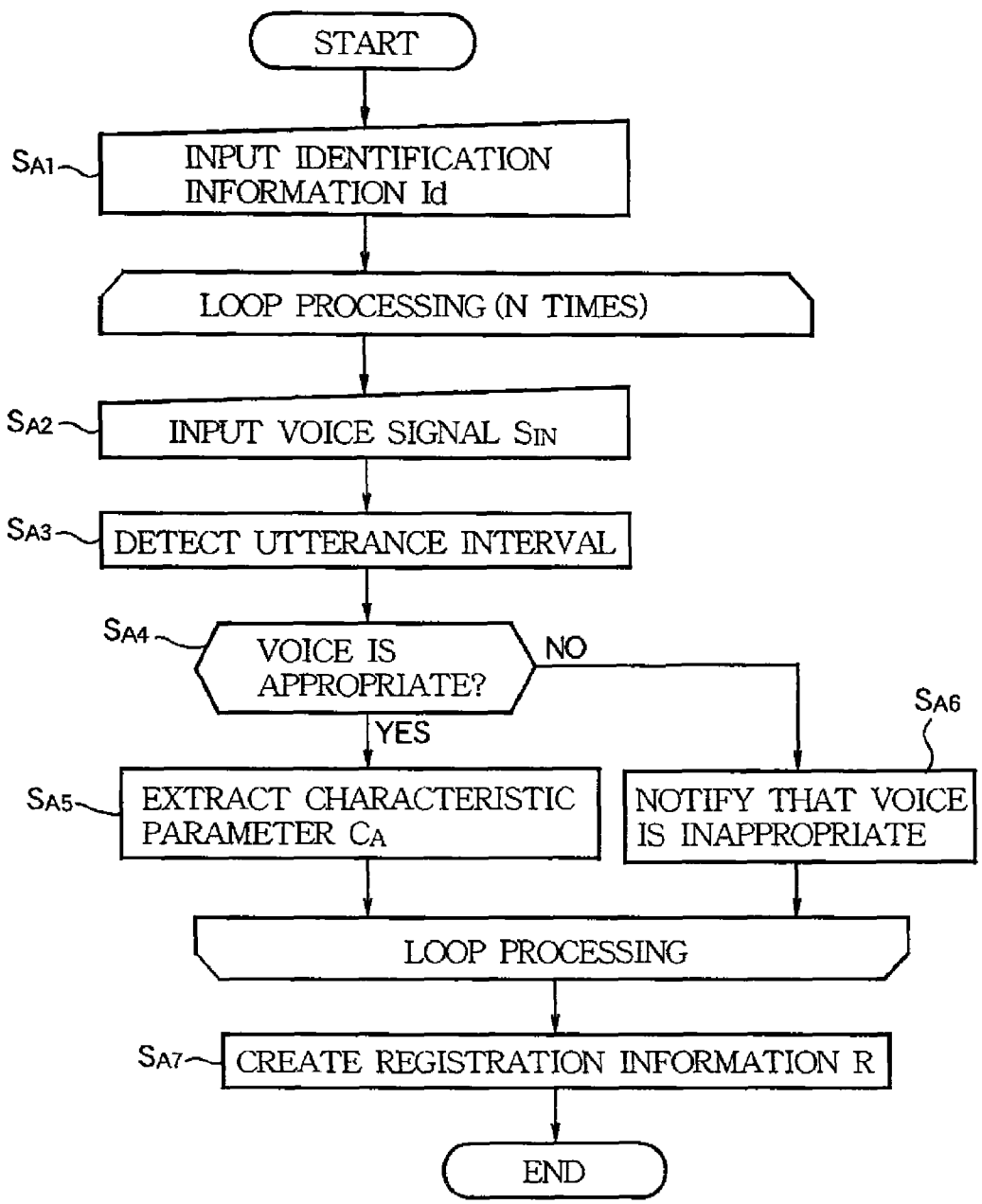

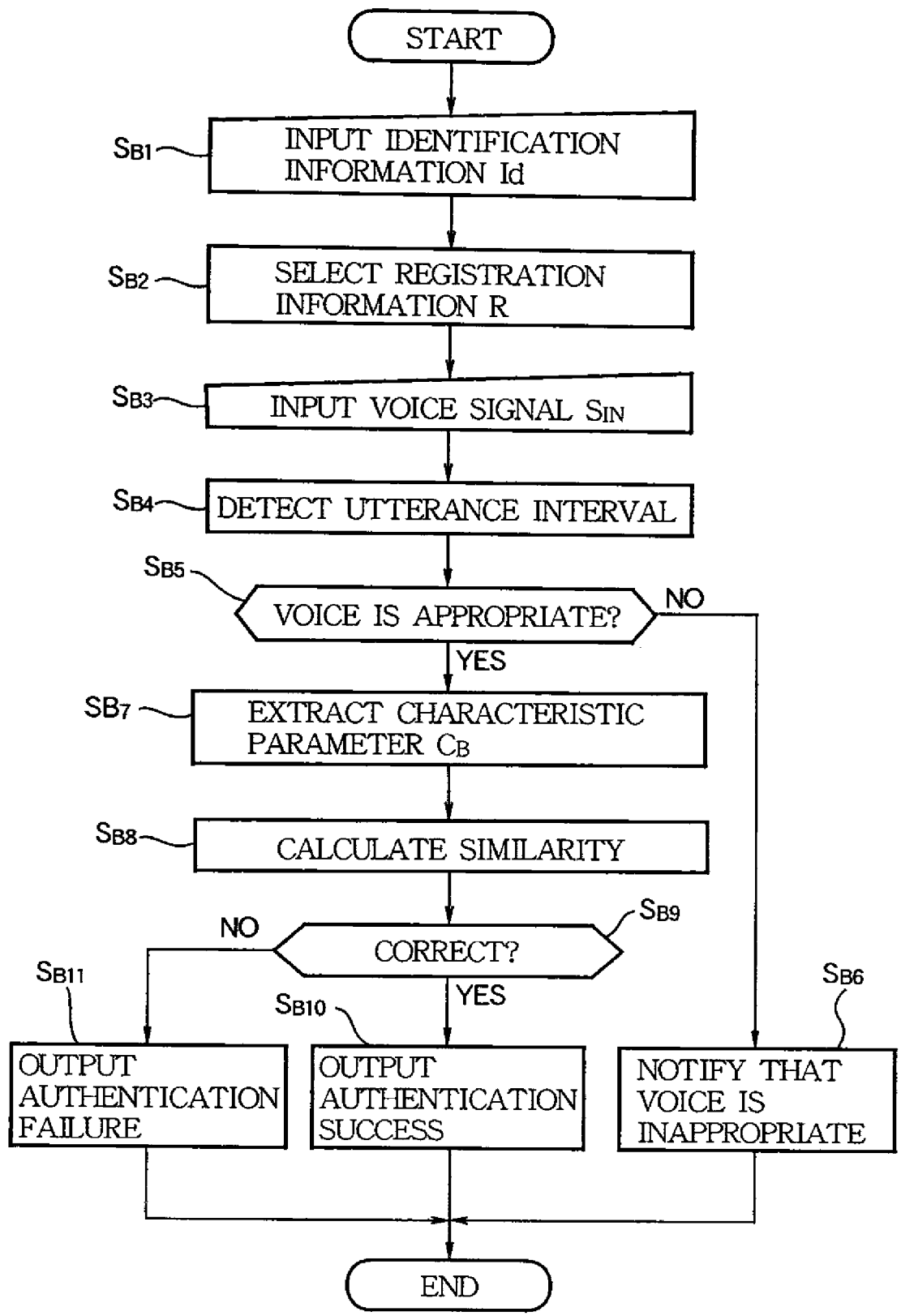

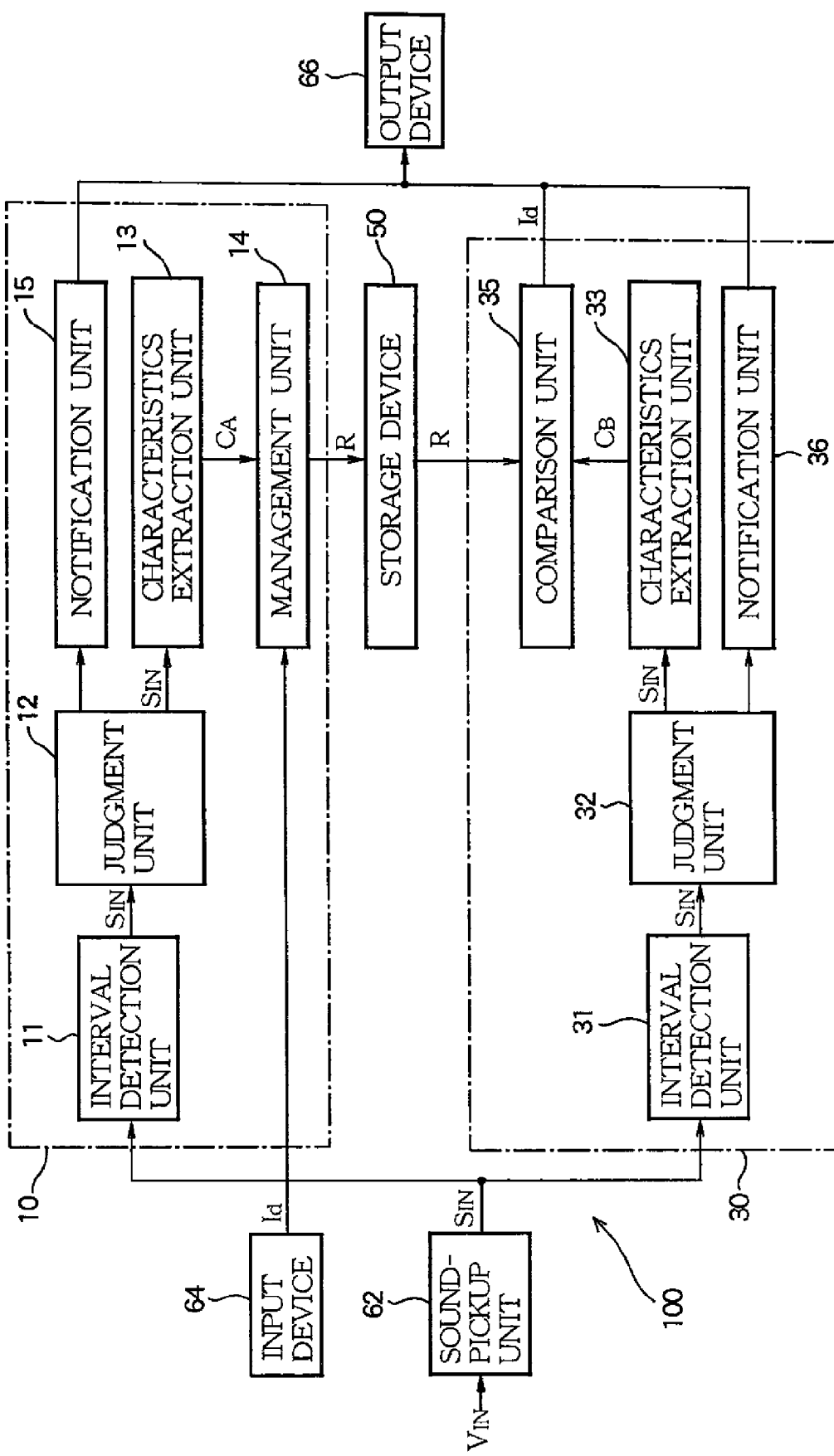

VOICE PROCESSING APPARATUS AND PROGRAM

BACKGROUND OF THE INVENTION

1. Technical Field

The present invention relates to a technology of creating or updating registration information (dictionary) containing a characteristic parameter of a given voice and to a technology of checking a characteristic parameter of a voice input by a user (hereinafter called "input voice") against a characteristic parameter of a given voice contained in the registration information.

2. Related Art

Conventionally, technologies of certifying the correctness of a speaker (speaker authentication) and of specifying a speaker among a plurality of registrants (speaker identification) have been proposed. In the speaker authentication and the speaker identification, voice registration and checking are carried out. At the stage of the registration, registration information is created based on a characteristic parameter extracted from an input voice, and at the stage of checking, a characteristic parameter of another input voice is checked against a characteristic parameter of the registration information (for instance, Non-Patent document 1 and Non-Patent document 2).

[Non Patent document 1] Tomoko MATSUI, "Speaker Recognition using HMM", Technical report of IEICE, The Institute of Electronics, Information and Communication Engineers (IEICE), January 1996, SP 95-111, pp. 17 to 24

[Non Patent document 2] Shoji HAYAKAWA and two others, "Speaker recognition using individual information in harmonic structure of linear predictive residual spectrum" Journal of IEICE, The Institute of Electronics, Information and Communication Engineers (IEICE), September 1997, A Vol. J80-1 No. 9, pp 1360 to 1367

However, a voice input at the time of the registration may not be suitable for creating and updating the registration information in some cases. For instance, in the case where the quantity of the input voice is extremely small, it is difficult to extract a characteristic parameter appropriately, and as a result the actually created registration information may be disconnected from the original feature of the speaker. Thus, there is a problem of degradation in the accuracy of the checking using the registration information. Similarly, if the input voice for the voice checking is inappropriate, even when the registration information sufficiently reflects the original feature of the speaker, the accuracy of the checking will be degraded.

SUMMARY OF THE INVENTION

In view of such circumstances, it is an object of the present invention to solve the problem in making registration information reflect the original feature of the speaker effectively. It is another object of the present invention to solve the problem in checking the input voice of the speaker accurately.

In order to solve the above-stated problems, a voice processing apparatus according to a first aspect of the present invention includes: a storage unit that stores registration information containing a characteristic parameter of a voice; a judgment unit that judges whether an input voice is appropriate or not for creating or updating the registration information; a management unit that, if the judgment unit judges that the input voice is appropriate, creates or updates the registration information based on a characteristic parameter of the input voice; and a notification unit that, if the judgment unit judges that the input voice is inappropriate, notifies a speaker of such. In this invention, since the characteristic parameter of the input voice that the judgment unit judges as being appropriate is reflected in the registration information, it is possible to create the registration information (dictionary) that reflects the original feature of the user's voice faithfully as compared with the configuration where an input voice is used for creating or updating the registration information irrespective of the appropriateness of the input voice.

Further, a voice processing apparatus according to a second aspect of the present invention includes: a storage unit that stores registration information containing a characteristic parameter of a given voice; a judgment unit that judges whether input voice is appropriate or not for checking; a comparison unit that, if the judgment unit judges that the input voice is appropriate, checks a characteristic parameter of the input voice against a characteristic parameter of the registration information stored in the storage unit; and a notification unit that, if the judgment unit judges that the input voice is inappropriate, notifies a speaker of such. In this invention, since checking is carried out by the comparison unit with respect to the input voice that the judgment unit judges as being appropriate, it is possible to improve the accuracy of the checking as compared with the configuration where any input voice is used for checking irrespective of the appropriateness of the input voice.

In the voice processing apparatuses according to the invention, any types of the criteria are selected for judgment of the appropriateness of the input voice. For instance, the judgment unit may judge appropriateness of the input voice based on at least one of a quantity of the input voice, a time length of the input voice and a level of noise contained in the input voice. Further, the appropriateness of the input voice may be judged based on the degree of a difference between the input voices uttered in succession. That is, the judgment unit may acquire a first input voice and a second input voice sequentially, and judge appropriateness of the second input voice based on a degree of a difference of the second input voice from the first input voice.

In a preferred form of the present invention, the notification unit notifies the speaker of the reason why the judgment unit judges the input voice as being inappropriate. According to the present embodiment, there is an advantage that the user can understand correct utterance easily. Of course, the configuration where the user is informed of only the fact that the input voice is judged as being inappropriate also can be adopted.

A voice processing apparatus according to a preferred embodiment of the present invention includes a characteristics extraction unit that, if the judgment unit judges that the input voice is appropriate, extracts a characteristic parameter of the input voice. According to the present embodiment, since the characteristics extraction unit may extract a characteristic parameter only when the input voice is judged as being appropriate, the load of the processing by the characteristics extraction unit can be reduced as compared with the configuration where a characteristic parameter is extracted irrespective of the appropriateness of the input voice.

A voice processing apparatus according to a preferred form of the present invention includes a characteristics extraction unit that extracts a characteristic parameter from an input voice, and a judgment unit judges appropriateness of the input voice based on the characteristic parameter extracted by the characteristics extraction unit. According to the present embodiment, since the characteristic parameter for creating or updating the registration information is used also for the judgment of the appropriateness of the input voice, the load of the processing for judging the appropriateness of the input voice can be reduced.

The characteristics extraction unit generates, as a characteristic parameter, an inter-band correlation matrix including as elements correlation values of an envelope of the input voice among a plurality of bands that are arranged on the frequency axis, for example. It is preferable that the plurality of bands are arranged with intervals on the frequency axis.

The voice processing apparatuses according to the invention can be defined as methods for creating or updating registration information or for checking a characteristic parameter. In a voice processing method according to the first aspect of the present invention, judgment is made as to whether an input voice is appropriate or not for creating or updating the registration information; if it is judged that the input voice is appropriate, registration information is created or updated based on a characteristic parameter of the input voice; and if it is judged that the input voice is inappropriate, a speaker is notified of such. Further, in a voice processing method according to the second aspect of the present invention, judgment is made as to whether an input voice is appropriate or not for checking; if it is judged that the input voice is appropriate, a characteristic parameter of the input voice is checked against a characteristic parameter of the registration information stored in the storage; and if it is judged that the input voice is inappropriate, a speaker is notified of such. Actions and effects similar to those of the voice processing apparatuses of the present invention can be achieved from the methods according to the above embodiments as well.

The voice processing apparatus of the present invention can be implemented by not only hardware (electronic circuit) such as DSP (Digital Signal Processor) dedicated to each processing but also by cooperation of a general-purpose processor such as CPU (Central Processing Unit) and programs. A program according to the first aspect of the invention makes a computer execute the following steps, the computer having a storage that stores registration information containing a characteristic parameter of a given voice: a judgment step of judging whether an input voice is appropriate or not for creating or updating the registration information; a management step of, if the judgment step judges that the input voice is appropriate, creating or updating the registration information based on a characteristic parameter of the input voice; and a notification step of, if the judgment step judges that the input voice is inappropriate, notifying a speaker of such. Further, a program according to the second aspect of the invention makes a computer execute the following steps, the computer having a storage that stores registration information containing a characteristic parameter of a given voice: a judgment step of judging whether an input voice is appropriate or not for checking; a comparison step of, if the judgment step judges that the input voice is appropriate, checking a characteristic parameter of the input voice against the characteristic parameter of the given voice contained in the registration information stored in the storage; and a notification step of, if the judgment step judges that the input voice is inappropriate, notifying a speaker of such. Actions and effects similar to those of the voice processing apparatuses of the present invention can be achieved from the programs according to the above embodiments as well. Note here that the programs of the present invention may be provided to a user while being stored in a portable and machine-readable storage medium such as a CD-ROM and be installed in a computer, or may be provided from a server by distribution via a network and be installed in a computer.

BRIEF DESCRIPTION OF THE DRAWINGS

FIG. 1 is a block diagram showing the configuration of a voice processing apparatus according to Embodiment 1 of the present invention.

FIG. 2 schematically shows the configuration of a dictionary.

FIG. 3 is a flowchart showing the operation of a registration unit.

FIG. 4 is a flowchart showing the operation of a checking unit.

FIG. 9 is a block diagram showing the configuration of a voice processing apparatus of Embodiment 5.

DETAILED DESCRIPTION OF THE INVENTION

A: Embodiment 1

Figure 5:
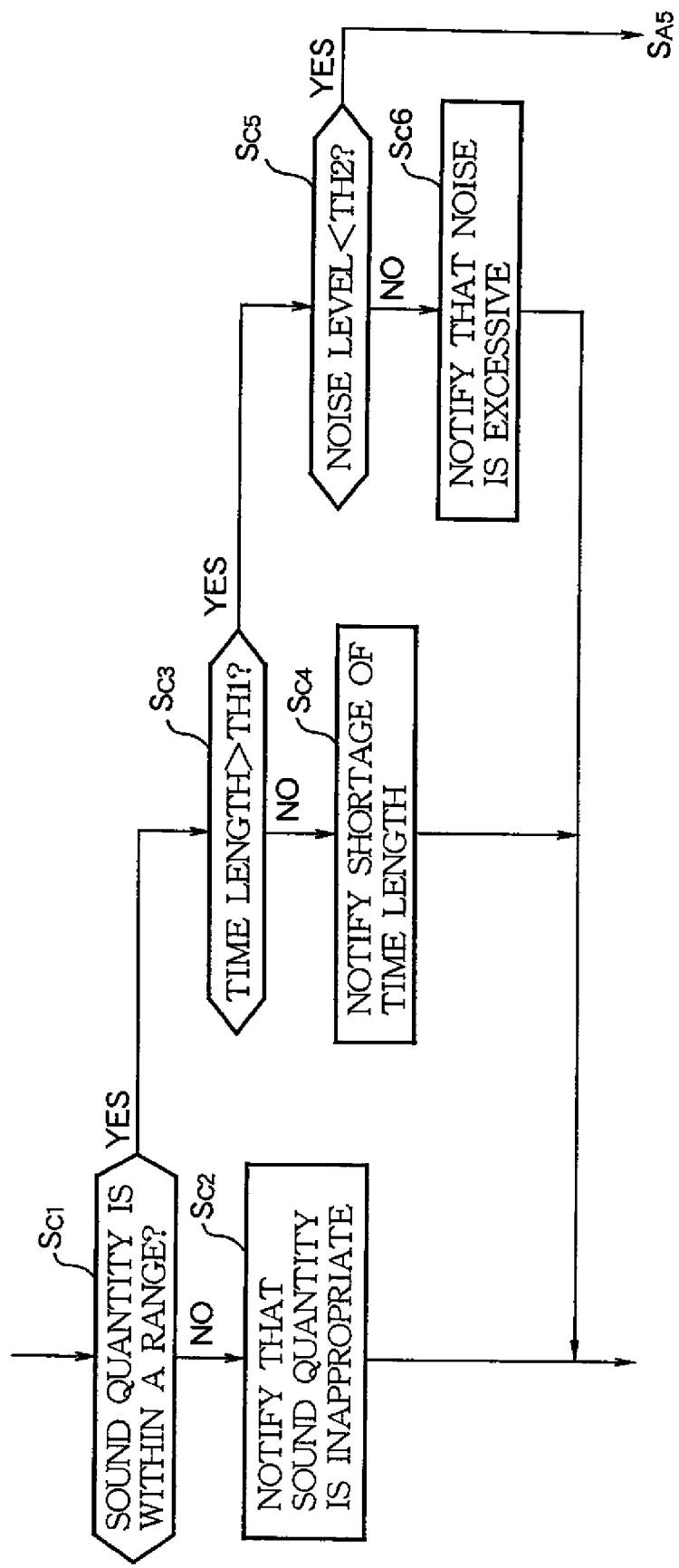
FIG. 5 is a flowchart showing the operation of a registration unit of Embodiment 2.

FIG. 1 is a block diagram showing the configuration of a voice processing apparatus according to Embodiment 1 of the present invention. A voice processing apparatus 100 of the present embodiment is an apparatus for speaker authentication that judges, based on a characteristic parameter of voice uttered by a user, the correctness or authenticity of a user (whether the user is an authorized user registered beforehand or not). As shown in FIG. 1, the voice processing apparatus 100 is provided with a registration unit 10, a checking unit 30 and a storage device 50. Each of the registration unit 10 and the checking unit 30 is connected with a sound-pickup unit 62, an input device 64 and an output device 66.

The storage device 50 stores a dictionary D that is used for the speaker authentication. FIG. 2 schematically shows the configuration of the dictionary D. As shown in FIG. 2, the dictionary D contains a plurality of pieces of registration information R each corresponding to a different user. A piece of registration information R contains identification information Id specific to each user (Id_1, ID_2, . . . ) and a characteristic parameter CA indicating the feature of voice of the user (CA_1, CA_2, . . . ). The characteristic parameter CA is a numerical value specific to a user. The characteristic parameter CA of the present embodiment is a time-series vector stream of cepstrum of voice uttered by a user.

The registration unit 10 of FIG. 1 is means for creating the registration information R and storing the same in the storage device 50. The checking unit 30 is means for carrying out the speaker authentication using the registration information R. The registration unit 10 and the checking unit 30 are implemented by executing a program by a processor (CPU). It should be noted that although FIG. 1 illustrates the registration unit 10 and the checking unit 30 separately, the registration unit 10 and the checking unit 30 can be implemented by even one processor.

The sound-pickup unit 62 generates a voice signal SIN representing the waveform of an input voice VIN uttered by the user. The input unit 64 includes a plurality of operators that the user operates. The user operates the input device 64 as appropriate, so as to input their own identification information Id and various instructions to the voice processing apparatus 100, for example. The output device 66 outputs various information under the control of the registration unit 10 and the checking unit 30. For instance, a display unit displaying an image instructed by the registration unit 10 and the checking unit 30 or a sound-output device (speaker or headphone) that outputs sound instructed by the registration unit 10 and the checking unit 30 is preferably used as the output device 66.

<A-1: Configuration and Operation of Registration Unit 10>

As shown in FIG. 1, the registration unit 10 includes an interval detection unit 11, a judgment unit 12, a characteristics extraction unit 13, a management unit 14 and a notification unit 15. The interval detection unit 11 detects an interval where the user actually utters voice from the voice signal SIN (hereinafter called "utterance interval"). For instance, the interval detection unit 11 detects, as the utterance interval, a section where the amplitude (sound level) of the voice signal SIN exceeds a threshold value.

The judgment unit 12 is means for judging, based on the voice signal SIN, whether the input voice VIN within the utterance interval is appropriate or not as the voice for creating registration information R. In other words, the judgment unit 12 judges, based on the voice signal SIN, whether the input voice VIN corresponds to the voice from which a characteristic parameter CA sufficiently reflecting the original feature of the voice of the user can be extracted or not.

When the quantity of the input voice VIN is too small, the characteristic parameter CA is disconnected from the feature of the voice of the user or the characteristic parameter CA cannot be extracted in some cases. On the other hand, when the quantity of the input voice VIN is too large, the characteristic parameter CA is disconnected from the original feature of the voice of the user in some cases, resulting from the occurrence of sound clipping, for example. Then, the judgment unit 12 of the present embodiment judges, based on the quantity of the input voice VIN, the appropriateness of the input voice VIN. More specifically, if the sound quantity or sound level is within a predetermined range, the judgment unit 12 judges the input voice VIN as being appropriate, whereas if the sound quantity is beyond the predetermined range, the judgment unit 12 judges the input voice VIN as being inappropriate.

The characteristics extraction unit 13 is means for, when the judgment unit 12 judges the input voice VIN as being appropriate, extracting a characteristic parameter CA of the input voice VIN. In the case where the judgment unit 12 judges that the input voice VIN is inappropriate, the characteristics extraction unit 13 does not carry out the extraction of the characteristic parameter CA. Since the characteristic parameter CA of the present embodiment is cepstrum, means for executing various operations including frequency analysis such as FFT (Fast Fourier Transform) processing is preferably used as the characteristics extraction unit 13. The management unit 14 is means for creating registration information R based on the characteristic parameter CA that the characteristics extraction unit 13 extracts and the identification information Id input through the input device 64 and storing the same in the storage device 50. Therefore, the registration information R reflects only the characteristic parameter CA of the input voice VIN that the judgment unit 12 judges as being appropriate, and is not affected by the input voice VIN that the judgment unit 12 judges as being inappropriate.

The notification unit 15 is means for, if the judgment unit 12 judges that the input voice VIN is inappropriate, making the output device 66 notify the user of such. That is, the notification unit 15 outputs a sound signal or a video signal to the output device 66 so as to let the output device 66 notify the user of a message as sound or image indicating that the input voice VIN is inappropriate. Namely, the notification unit 15 alarms or warns the user that the input voice is not suitable or adequate for creating or updating the registration information. Such a notification may prompt the user to perform another session of inputting a voice for executing the creation or updating of the registration information.

FIG. 3 is a flowchart showing the operation of the registration unit 10. The processing of this drawing is initiated by a predetermined operation (instruction to start the registration) to the input device 64, for example. Firstly, the user operates the input device 64 to input his own identification information Id (Step SA1). Next, the loop processing from Step SA2 to Step SA6 is repeated N times (N is a natural number).

At Step SA2, when a voice signal SIN is supplied from the sound-pickup device 62, the interval detection unit 11 detects an utterance interval of the voice signal SIN (Step SA3). Next, the judgment unit 12 judges, based on the voice signal SIN within the utterance interval, whether the input voice VIN is appropriate for the creation of registration information R or not (Step SA4). More specifically, the judgment unit 12 judges whether the quantity of the voice signal SIN within the utterance interval is within a predetermined range or not. If the sound quantity is within the predetermined range (i.e., in the case where the input voice VIN is appropriate), the characteristics extraction unit 13 extracts a characteristic parameter CA from the voice signal SIN (Step SA5). On the other hand, if the sound quantity is out of the predetermined range (i.e., in the case where the input voice VIN is inappropriate), the notification unit 15 makes the output device 66 output a message indicating that the input voice VIN is inappropriate (step SA6). When the user is notified that his own utterance is inappropriate by noticing the output (sound or image) from the output device 66, the user adjusts the volume of his utterance appropriately from the next time.

After the loop processing is repeated N times, the management unit 14 associates a characteristic parameter CA that is an average of the loop processing repeated plural times with the identification information Id input at Step SA1 to create registration information R and stores the same in the storage device 50 (Step SA7).

As described above, in the present embodiment, the registration information R reflects only the characteristic parameter CA of the input voice VIN that the judgment unit 12 judges as being appropriate. Therefore, it is possible to create a dictionary D faithfully reflecting the original feature of the voice of the user. Further, if the input voice VIN is inappropriate, the notice by the output device 66 urges the user to improve his utterance (change of the sound level), and therefore the frequency of inappropriate utterance is decreased from the next time. Thus, it becomes possible to calculate the characteristic parameter CA sufficiently reflecting the original feature of the voice of the user (moreover, to create a dictionary D faithfully reflecting the original feature of the voice of the user).

<A-2: Configuration and Operation of Checking Unit 30>

The following describes the configuration and the operation of the checking unit 30. As shown in FIG. 1, the checking unit 30 includes an interval detection unit 31, a judgment unit 32, a characteristics extraction unit 33, a selection unit 34, a comparison unit 35 and a notification unit 36. Similarly to the interval detection unit 11, the interval detection unit 31 detects an utterance interval of a voice signal SIN.

The judgment unit 32 is means for judging, based on the voice signal SIN, whether the input voice VIN within the utterance interval is appropriate or not as a target voice of the speaker authentication. That is, the judgment unit 32 judges, based on the voice signal SIN, whether the voice signal SIN reflects the original feature of the voice of the user sufficiently in a degree required for securing the accuracy of the speaker authentication. Similarly to the judgment unit 12, the judgment unit 32 of the present embodiment judges the appropriateness of the input voice VIN based on the quantity of the input voice VIN. That is to say, if the sound quantity is within a predetermined range, the judgment unit 32 judges the input voice VIN as being appropriate, whereas if the sound level is out of the predetermined range, the judgment unit 32 judges the input voice VIN as being inappropriate.

Similarly to the characteristics extraction unit 13, the characteristics extraction unit 33 is means for, when the judgment unit 32 judges the input voice VIN as being appropriate, extracting a characteristic parameter CB of the input voice VIN. The characteristic parameter CB is a numerical value of a type similar to the characteristic parameter CA (thus, in the present embodiment, it is cepstrum). In the case where the judgment unit 32 judges that the input voice VIN is inappropriate, the characteristics extraction unit 33 does not carry out the extraction of the characteristic parameter CB.

The selection unit 34 is means for selecting, from the dictionary D stored in the storage device 50, registration information R containing the identification information Id input through the input device 64. The comparison unit 35 compares (checks) the characteristic parameter CB extracted by the characteristics extraction unit 33 and the characteristic parameter CA in the registration information R selected by the selection unit 34. More specifically, the comparison unit 35 calculates a similarity between the characteristic parameter CA and the characteristic parameter CB (e.g., a distance and a likelihood), and verifies the correctness of the user based on the magnitude of the similarity. A result of the authentication by the comparison unit 35 is output to the output device 66.

Similarly to the notification unit 15, the notification unit 36 is means for, if the judgment unit 32 judges that the input voice VIN is inappropriate, making the output device 66 notify the user of such. That is, the notification unit 36 outputs a sound signal or a video signal to the output device 66 so as to let the output device 66 notify the user of a message as sound or image indicating that the input voice VIN is inappropriate. Namely, the notification unit 36 alarms or warns the user that the input voice is not suitable or adequate for voice checking or voice authentication. Such a notification may prompt the user to perform another session of inputting a voice for retrying voice checking or voice authentication.

FIG. 4 is a flowchart showing the operation of the checking unit 30. The processing of this drawing is initiated by a predetermined operation (instruction to start the speaker authentication) to the input device 64. Firstly, the user's identification information Id is input through the input device 64 (Step SB1). The selection unit 34 searches and acquires, from the dictionary D, the registration information R containing the identification information Id input at Step SB1 (Step SB2).

At Step SB3, when a voice signal SIN is supplied from the sound-pickup device 62, the interval detection unit 31 detects an utterance interval of the voice signal SIN (Step SB4). Next, the judgment unit 32 judges, based on the voice signal SIN within the utterance interval, whether the input voice VIN is appropriate for the speaker authentication (Step SB5). More specifically, the judgment unit 32 judges whether the quantity of the voice signal SIN within the utterance interval is within a predetermined range or not. If the sound quantity is out of the predetermined range (i.e., in the case where the input voice VIN is inappropriate), the notification unit 36 makes the output device 66 output a message indicating that the input voice VIN is inappropriate (Step SB6) and completes the speaker authentication.

On the other hand, in the case where the sound quantity is within the predetermined range (i.e., in the case where the input voice VIN is appropriate), the characteristics extraction unit 33 extracts a characteristic parameter CB from the voice signal SIN (Step SB7). Next, the comparison unit 35 calculates a similarity between the characteristic parameter CA in the registration information R acquired at Step SB2 and the characteristic parameter CB extracted at Step SB7 (Step SB8), and judges the correctness of the user based on whether the similarity exceeds a predetermined threshold value or not (Step SB9). In the case where the similarity exceeds the predetermined threshold value (i.e., in the case where the correctness of the user is certified), the comparison unit 35 makes the output device 66 output a message indicating that the authentication succeeded (Step SB10). On the other hand, in the case where the similarity falls below the predetermined threshold value (i.e., in the case where the correctness of the user is denied), the comparison unit 35 makes the output device 66 output a message indicating that the authentication failed (Step SB11).

As described above, in the present embodiment, the checking by the comparison unit 35 is carried out only when the judgment unit 32 judges that the input voice VIN is appropriate, and therefore there is an advantage that the load of the processing by the comparison unit 35 can be reduced as compared with the configuration where the checking is carried out irrespective of the appropriateness of the input voice VIN. Further, if the input voice VIN is inappropriate, the notice by the output device 66 urges the user to improve his utterance, and therefore the possibility of a failure by an authorized user in the following operations can be reduced. Moreover, as already described, since the characteristic parameter CA of the registration information R faithfully reflects the original feature of the voice of the authorized user, more accurate authentication is enabled as compared with the configuration where the characteristic parameter CA is reflected in the registration information irrespective of the appropriateness of the input voice VIN.

B: Embodiment 2

Although Embodiment 1 exemplifies the configuration where the judgment concerning the appropriateness of the input voice VIN is made based on the sound level, the criteria of the judgment concerning the appropriateness of the input voice VIN is not limited to the sound quantity. For instance, if a time length of the utterance interval of the input voice VIN (a time length while the user continues the utterance) is short or if a level of the noise contained in the input voice VIN is high, it is difficult to extract a characteristic parameter (CA, CB) faithfully reflecting the feature of the user's voice. Then, in the present embodiment, a time length of the utterance interval and a level of the noise are used for the judgment concerning the appropriateness of the input voice VIN, in addition to the quantity of the input voice VIN.

FIG. 5 is a flowchart showing the processing where a judgment unit 12 of the present embodiment judges the appropriateness of the input voice VIN. The judgment unit 12 carries out the processing of FIG. 5, instead of Step SA4 and SA6 of FIG. 3. Firstly, similarly to Embodiment 1, the judgment unit 12 judges whether the quantity of the input voice VIN is within a predetermined range or not (Step SC1). If a result of Step SC1 is no (in the case where the input voice VIN is inappropriate), a notification unit 15 makes an output device 66 output a message indicating that the quantity of the input voice VIN is inappropriate (Step SC2).

If the result of Step SC1 is yes, the judgment unit 12 judges whether the time length of the utterance interval detected at Step SA3 exceeds a threshold value TH1 or not (Step SC3). It is difficult to calculate an accurate characteristic parameter CA if the input voice VIN is short. Thus, if the result of Step SC3 is no, the notification unit 15 makes the output device 66 output a message indicating that the time length of the utterance is short (Step SC4). That is, it is judged that the input voice VIN with a time length of the utterance interval being a short is inappropriate as the voice for the creation of the registration information R. The threshold value TH1 is selected experimentally or statistically so that the judgment of Step SC3 results in yes when the utterance interval is long enough for calculating an appropriate characteristic parameter CA.

If the result of Step SC3 is yes, the judgment unit 12 judges whether the noise level of the voice signal SIN (e.g., S/N ratio of the voice signal SIN) falls below a threshold value TH2 or not (Step SC5). It is difficult to calculate an accurate characteristic parameter CA if the level of the noise contained in the input voice VIN is high. Thus, if the result of Step S5 is no, the notification unit 15 makes the output device 66 output a message indicating that the there is excessive noise (Step SC6). That is, it is judged that the input voice VIN with a lot of noise is inappropriate as the voice for the creation of the registration information R. The threshold value TH2 is selected experimentally or statistically so that the judgment of Step SC5 results in yes when the noise of the input voice VIN is less enough for calculating an appropriate characteristic parameter CA.

If the result of Step SC5 is yes, the process proceeds to Step SA5 of FIG. 3 where a characteristic parameter CA is extracted from the voice signal SIN. As described above, in the present embodiment, not only in the case where the quantity of the input voice VIN is beyond the predetermined range, but also in the case where the time length of the utterance interval is too short and the noise level is too high, the input voice VIN is not reflected in the registration information R. Thus, the registration information R reflecting the original feature of the user's voice more faithfully than Embodiment 1 can be created. Further, since the user is notified of specific reasons for the judgment that the input voice VIN is inappropriate, there is an advantage that the user can understand appropriate utterance more easily than Embodiment 1.

Note here that although the above description exemplifies the operation of the registration unit 10, the checking unit 30 may carry out the processing of FIG. 5 instead of Step SB5 and Step SB6 of FIG. 4. That is, the judgment unit 32 carries out the judgment of FIG. 5 (Step SC1, SC3 and SC5), and the notification unit 36 carries out the notice of FIG. 5 (Step SC2, SC4 and SC6). Since the user is notified of the reasons for the judgment that the input voice VIN is inappropriate, the possibility of denying the authentication of a correct user can be reduced. Further, although the above description exemplifies the configuration of judging the sound quantity, the time length of the utterance interval and the noise level of the input voice VIN, the configuration where the appropriateness of the input voice VIN is judged only based on the time length of the utterance interval or the configuration where the appropriateness of the input voice VIN is judged only based on the noise level also can be used.

C: Embodiment 3

The above embodiments exemplify the configuration in which the appropriateness of input voice VIN is judged by the comparison of a numerical value determined from the volume, the time length of the utterance interval, the noise level of the input voice VIN, for example, (this will be referred to as "characteristic value" hereinafter in order to distinguish it from the characteristic parameter CA to be contained in registration information R) with a predetermined threshold value. On the other hand, in the present embodiment, the appropriateness of the input voice VIN is judged by the comparison of input voices VINs input in succession among the input voices VINs uttered a plurality of times.

The registration information R of the present embodiment, as described about Step SA7 of FIG. 3, contains the characteristic parameter that is an average of a plurality of times. On the other hand, in the case where the user utters a plurality of times as in FIG. 3, the characteristic of the input voice VIN may vary unexpectedly and accidentally to be different from their original voice. In order to produce the registration information R faithfully reflecting the original feature of the user's voice, there is a need to eliminate the influences of the unexpectedly varied input voice VIN. Thus, when the characteristic value of each input voice changes significantly from the characteristic value of the voice VIN input last time, a judgment unit 12 of the present embodiment judges that the input voice VIN this time is inappropriate. The following describes in more detail.

Every time a voice signal SIN is input at the loop processing of FIG. 3 (Step SA2), a registration unit 10 stores the characteristic value of the voice signal SIN within the utterance interval in a storage device 50. At Step SA4, the judgment unit 12 compares the characteristic value of the voice signal SIN input this time with the characteristic value of the voice signal SIN that is judged last time as being appropriate, and judges the appropriateness of the input voice VIN this time based on the degree of a difference of them. More specifically, the judgment unit 12 calculates a difference value between the characteristic value of the voice signal SIN this time and the characteristic value of the voice signal SIN last time, and if the difference value falls below a predetermined threshold value (i.e., the change of the input voice VIN is small), the judgment unit 12 judges that the input voice VIN this time is appropriate, whereas if the difference value exceeds the predetermined threshold value (i.e., the change of the input voice VIN is large), the judgment unit 12 judges that the input voice VIN this time is inappropriate. A characteristics extraction unit 13 and a notification unit 15 operate in a similar manner to Embodiment 1.

As described above, in the present embodiment, since it is judged that the input voice VIN that changes significantly from the last one is inappropriate, it is possible to eliminate the influences of accidental change of the input voice VIN from the registration information R. Thus, it is possible to create registration information R that reflects the original feature of the user's voice more faithfully than Embodiment 1.

D: Embodiment 4

The above embodiments exemplify the configuration where if the judgment unit 12 judges that the input voice VIN is appropriate, the characteristics extraction unit 13 extracts a characteristic parameter CA. On the other hand, in the present embodiment, a judgment unit 12 judges, based on a characteristic parameter extracted by a characteristics extraction unit 13, the appropriateness of the input voice VIN.

Figure 6:
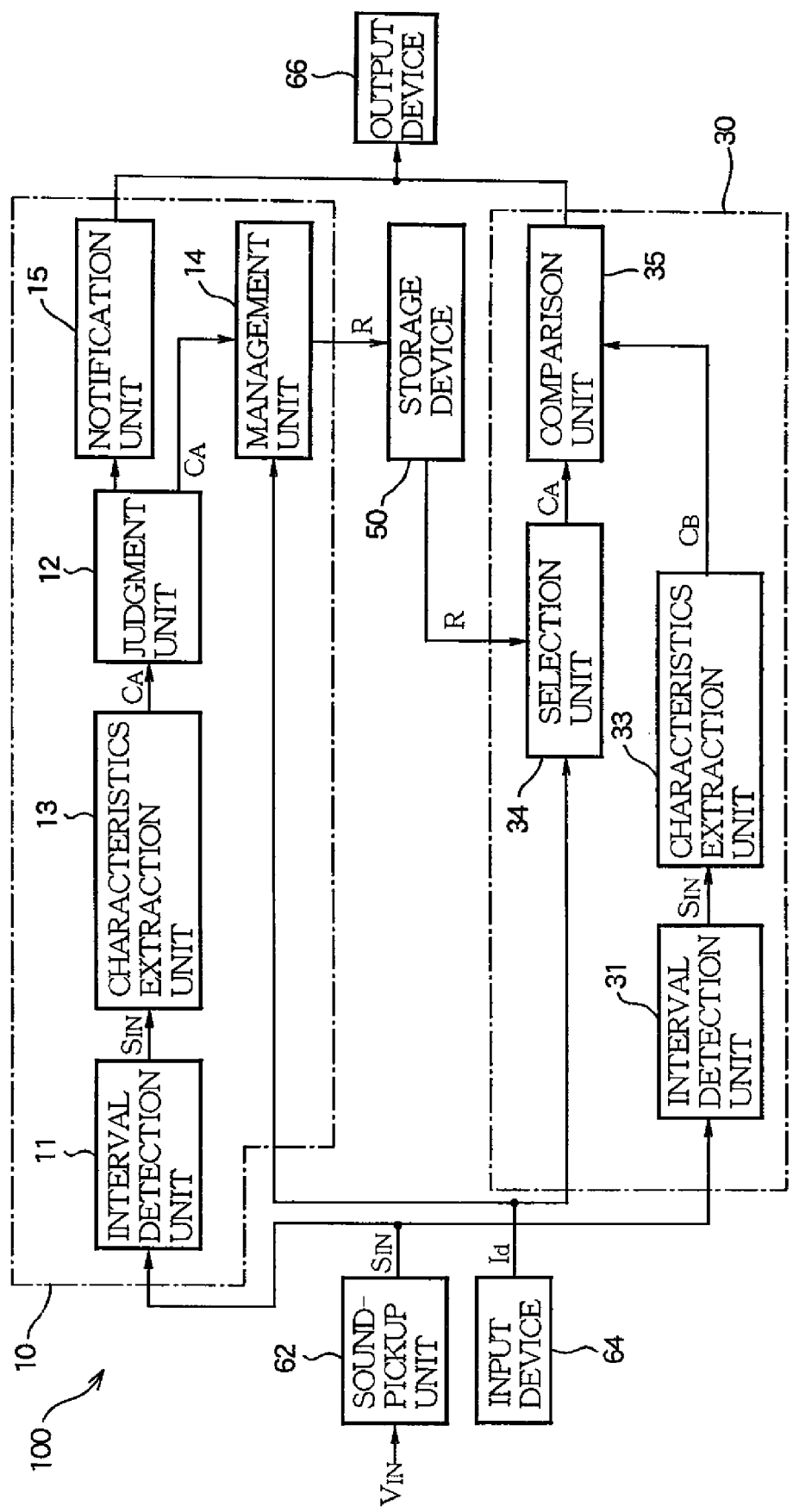
FIG. 6 is a block diagram showing the configuration of a voice processing apparatus of Embodiment 4.

FIG. 6 is a block diagram showing the configuration of a voice processing apparatus 100. As shown in this drawing, the characteristics extraction unit 13 of the registration unit 10 is inserted between an interval detection unit 11 and a judgment unit 12. Further, a characteristics extraction unit 33 of a checking unit 30 is inserted between an interval detection unit 31 and a comparison unit 35. Each of the characteristics extraction units 13 and 33 extracts an inter-band correlation matrix as the characteristic parameter (CA, CB). The inter-band correlation matrix is a matrix including, as elements, correlation values of envelopes for the respective components obtained by dividing the voice into a plurality of bands. For further details of the inter-band correlation matrix, all contents of co-pending U.S. patent application Ser. No. 11/726,077 are herein incorporated into the specification by referencing thereto.

Figure 7:
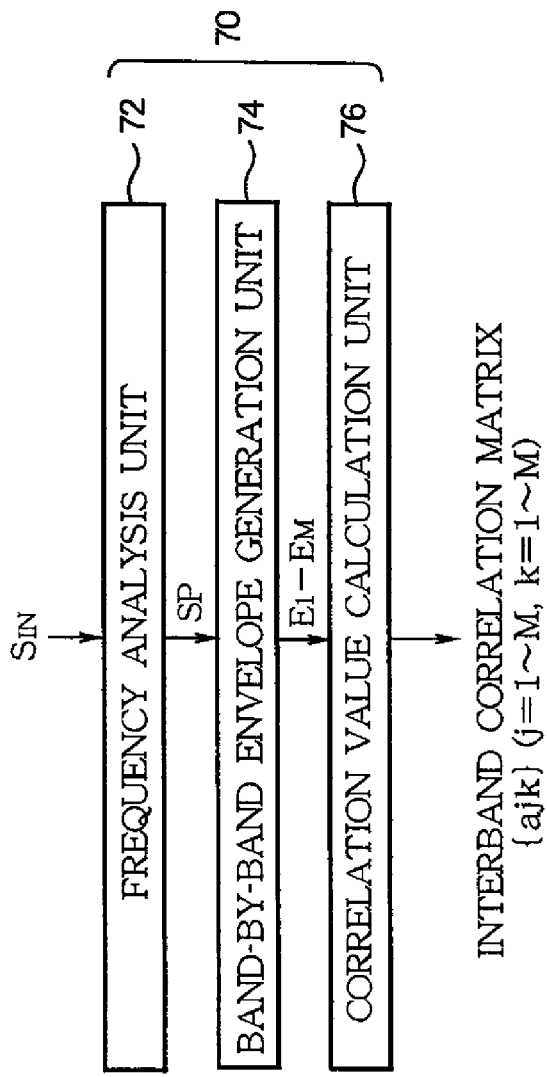
FIG. 7 is a block diagram showing the configuration of an inter-band correlation matrix generation unit.

The characteristics extraction units 13 and 33 each include an inter-band correlation matrix generation unit 70 of FIG. 7. The inter-band correlation matrix generation unit 70 is made up of a frequency analysis unit 72, a band-by-band envelope generation unit 74 and a correlation value calculation unit 76. The frequency analysis unit 72 carries out FFT processing to a voice signal SIN within the utterance interval where a frame of a predetermined time length is set as a unit, so as to calculate an amplitude spectrum SP for each frame.

Figure 8:
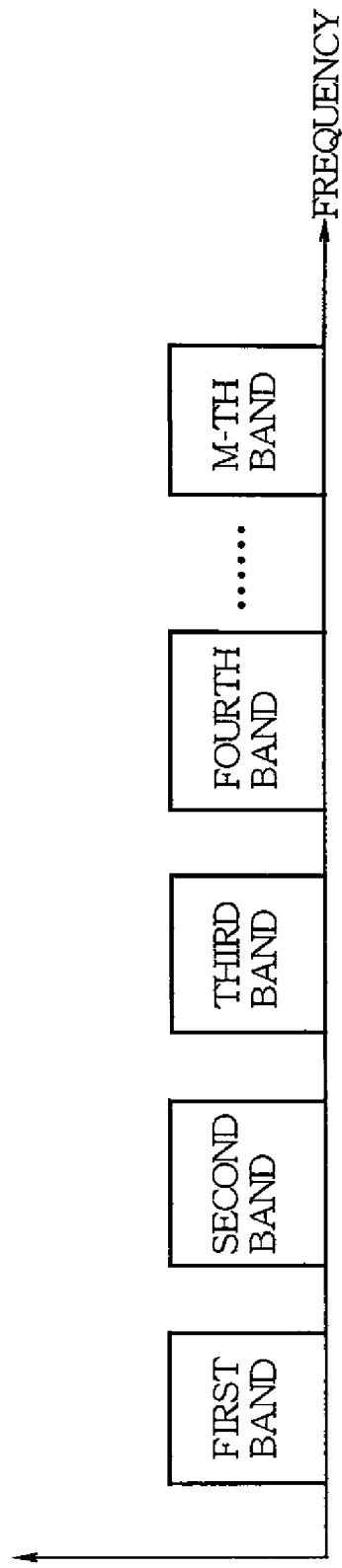
FIG. 8 schematically shows M pieces of bands from which envelopes are extracted.

The narrow band envelope generation unit 74 extracts, from the amplitude spectrum SP, an envelope component or envelope segment belonging to each of the plurality of narrow bands that are arranged with intervals on the frequency axis. More specifically, firstly, as shown in FIG. 8, the band-by-band envelope generation unit 74 extracts, from the amplitude spectrum SP for each frame, a component belonging to each of the first band through the M-th band (M is a natural number of 2 or more) that are arranged with intervals on the frequency axis as shown in FIG. 8, and converts it into a decibel value form. Secondly, the band-by-band envelope generation unit 74 determines, for each of the first band through the M-th band, the transition of the amplitude spectrum SP in a decibel form obtained for each frame, and outputs an envelope Ei (i=1 to M) of a component of voice belonging to each of the first band to the M-th band. Herein, the envelope Ei for each band may be determined by inputting a voice signal SIN into a filter bank made up of a plurality of band-pass filter each having a different passband and performing the processing of half-wave rectification, smoothing or the like to a signal of each band that has passed through the filter bank.

The correlation value calculation unit 76 calculates a correlation value ajk about all combinations of the envelope Ej of the j-th band (j=1 to M) and the envelope Ek of the k-th band (k=1 to M). The matrix of M rows and M columns including the correlation value ajk as an element is an inter-band correlation matrix. Every time a voice signal SIN is input at the loop processing of FIG. 3 (Step SA2), the characteristics extraction unit 13 calculates an inter-band correlation matrix sequentially as a characteristic parameter CA and stores the same in the storage device 50. Further, the characteristics extraction unit 33 calculates an inter-band correlation matrix as a characteristic parameter CB.

Similarly to Embodiment 3, every time the loop processing of FIG. 3 is performed, the judgment unit 12 compares the characteristic parameter CA of the voice signal SIN input this time with the characteristic parameter CA of the input voice VIN that is judged last time as being appropriate, and judges the appropriateness of the input voice VIN this time based on the degree of a difference of them. More specifically, the judgment unit 12 calculates a similarity between the characteristic parameter CA this time and the characteristic parameter CA of the input voice VIN that is judged as being appropriate last time, and if the similarity exceeds a predetermined threshold value (i.e., the change of the input voice VIN is small), the judgment unit 12 judges that the input voice VIN this time is appropriate, whereas if the similarity falls below the predetermined threshold value (i.e., the change of the input voice VIN is large), the judgment unit 12 judges that the input voice VIN this time is inappropriate. The similarity D between the characteristic parameter CA this time (inter-band correlation matrix A) and the past characteristic parameter CA (inter-band correlation matrix B) may be calculated by the following expression (1), for example:

$$D=\sqrt{\{\text{trace}(AB^{-1})\cdot\text{trace}(BA^{-1})\}} \quad (1)$$

where the operator "trace ( )" in the expression (1) means the sum of diagonal elements of the square matrix in the parentheses.

A management unit 14 of FIG. 6 stores, in the storage device 50, a characteristic parameter CA that is an average of a plurality of input voices VINs that are judged as being appropriate by the judgment unit 12, together with the identification information Id, as the registration information R. The input voice VIN that is judged as being inappropriate by the judgment unit 12 is not reflected in the registration information R. Further, in the case where the judgment unit 12 judges that the input voice VIN is inappropriate, a message indicating such is output from an output device 66, which is a similar configuration to that of Embodiment 1.

Meanwhile, the comparison unit 35 compares the characteristic parameter CB calculated by the characteristics extraction unit 33 with the characteristic parameter CA in the registration information R corresponding to the identification information Id. That is, the comparison unit 35 calculates a similarity D between the characteristic parameter CA (inter-band correlation matrix A) and the characteristic parameter CB (inter-band correlation matrix B) by the expression (1), and if the similarity D exceeds the predetermined threshold value, the comparison unit 35 certifies the correctness of the user, whereas if the similarity D falls below the predetermined threshold value, the comparison unit 35 judges that the user is false.

As described above, in the present invention, since the input voice VIN with a small similarity to the last one is judged as being inappropriate, it is possible to eliminate the influences of unexpected and accidental change of the input voice VIN from the registration information R. Thus, similarly to Embodiment 3, it is possible to create registration information R that reflects the original feature of the user's voice faithfully.

Meanwhile, the article published at The Institute of Electronics, Information and Communication Engineers (IEICE), in March 2002 "Talker Identification using Narrow-band Envelope Correlation Matrix" (Michiko KAZAMA, Mikio TOHYAMA and Yoshio YAMASAKI) discloses an inter-band correlation matrix including as elements correlation values of an envelope of each of the adjacent bands without a gap therebetween on the frequency axis. However, normally, the correlation values of an envelope of each of the adjacent bands on the frequency axis are high. Therefore, variations among individuals less appear in the inter-band correlation matrix disclosed in the above article, and there is a limit to improve the accuracy to evaluate the similarity of the voice.

On the other hand, the inter-band correlation matrix of the present embodiment is a matrix including as elements correlation values of an envelope of each of the bands that are arranged with intervals or spaces on the frequency axis as illustrated in FIG. 8. That is, it can eliminate the elements making the variations among individuals less appear. Therefore, the variation among individuals in the characteristic parameter CA and the characteristic parameter CB become remarkable, leading to an advantage of improving the accuracy of authentication. Of course, the configuration that calculates, as the characteristic parameter (CA, CB), an inter-band correlation matrix including as elements correlation values of an envelope of each of the adjacent bands without a gap therebetween on the frequency axis also can be used.

Note that although the above description exemplifies the configuration where a component of each of the bands that are arranged with intervals on the frequency axis is extracted from the amplitude spectrum SP, the inter-band correlation matrix may be generated in the following procedure. Firstly, an inter-band correlation matrix (2M rows×2M columns) is generated from an envelope of each of a plurality of bands (e.g., the first band to the 2M-th band) that are arranged without a gap therebetween on the frequency axis. Secondly, a sub-matrix (inter-band correlation matrix) made up of elements extracted from the original inter-band correlation matrix with predetermined row intervals and predetermined column intervals is generated as characteristic parameter (CA, CB). Similar effects to Embodiment 4 can be obtained from such embodiment as well.

E: Embodiment 5

The following describes Embodiment 5 using a voice processing apparatus 100 for the speaker identification that identifies a speaker based on a voice signal SIN. FIG. 9 is a block diagram showing the configuration of the voice processing apparatus 100. The voice processing apparatus 100 is provided with a registration unit 10 and a storage device 50 similar to those in Embodiment 1. A checking unit 30 of the present embodiment does not include the selection unit 34 of FIG. 1.

The checking unit 30 operates at the respective intervals in a similar manner to Embodiment 1, except for a comparison unit 35. The comparison unit 35 compares a characteristic parameter CB extracted by a characteristics extraction unit 33 with a characteristic parameter CA of each registration information R of a dictionary D, to search the characteristic parameter CA that is the most similar to the characteristic parameter CB (i.e., the largest similarity). Then, the comparison unit 35 acquires, from the storage device 50, identification information Id corresponding to the thus searched characteristic parameter CA, and outputs the same to an output device 66. That is, the user who uttered the input voice VIN actually is identified among a plurality of users who created the registration information R beforehand.

In the present embodiment, since the characteristic parameter CA of the input voice VIN that the judgment unit 12 judges as being appropriate only is reflected in the registration information R as described in Embodiment 1, a dictionary D faithfully reflecting the original feature of the user's voice is created. Thus, it is possible to identify the user with higher accuracy as compared with the configuration where input voice VIN is reflected in the registration information R irrespective of the appropriateness of the input voice VIN. Note here that although FIG. 9 illustrates the configuration based on Embodiment 1, it is naturally possible to apply the present embodiment to the configuration of Embodiment 2 to Embodiment 4 for the use of speaker identification.

F: Modified Examples

The above embodiments may be modified variously. The following are specific modified examples. It should be noted here that the following embodiments may be combined appropriately.

(1) Modified Example 1

The criteria for the appropriateness of the input voice VIN (characteristic value and characteristic parameter CA, CB) are not limited to the above-stated examples. For instance, in Embodiment 4, although the intensity of an envelope of each of the plurality of bands defined on the frequency axis varies within the band normally, the intensity of an envelope of any one of the bands may become constant due to the cancellation in calculation, for example. In view of these natures, the following configuration is possible, in which during the course of calculating an inter-band correlation matrix from the input voice VIN by the characteristics extraction unit 13 of FIG. 6, if the intensity of an envelope within at least one band is a constant value, then the corresponding input voice VIN is judged as being inappropriate.

(2) Modified Example 2

Although the above embodiments exemplify the case of creating registration information R, the above embodiments can be applied also to the case where already created registration information R is updated. That is, the management unit 14 searches, from the dictionary D, the registration information R containing the identification information Id input through the input device 64, and updates the characteristic parameter CA in the registration information R based on the characteristic parameter CA newly extracted by the characteristics extraction unit 13.

(3) Modified Example 3

The contents of the characteristic parameter (CA, CB) are changed where appropriate. For instance, the characteristic parameter (CA, CB) in Embodiment 1 through Embodiment 3 may be the inter-band correlation matrix in Embodiment 4. Further, the configuration where the registration information R contains a plurality of characteristic parameters CAs also is used.

The invention claimed is:
1. A voice processing apparatus, comprising:
a storage unit that stores registration information containing a characteristic parameter of a given voice;
a judgment unit that judges whether an input voice is appropriate or not for creating or updating the registration information when the input voice is acquired, based on a degree of a difference between an inter-band correlation matrix of the input voice acquired this time and an inter-band correlation matrix of another input voice that is judged as being appropriate last time, wherein elements of both inter-band correlation matrices include correlation values of envelopes from a plurality of frequency bands;
a management unit that creates or updates the registration information based on a characteristic parameter of the input voice when the judgment unit judges that the input voice is appropriate; and
a notification unit that notifies a speaker of the input voice when the judgment unit judges that the input voice is inappropriate.
2. The voice processing apparatus according to claim 1, wherein the judgment unit judges whether the input voice is appropriate or not, based on at least one of a quantity of the input voice, a time length of the input voice and a level of noise contained in the input voice.

3. A voice processing apparatus, comprising:
a storage unit that stores registration information containing a characteristic parameter of a given voice;
a judgment unit that judges whether an input voice is appropriate or not for checking against the given voice when the input voice is acquired, based on a degree of a difference between an inter-band correlation matrix of the input voice acquired this time and an inter-band correlation matrix of another input voice that is judged as being appropriate last time, wherein elements of both inter-band correlation matrices include correlation values of envelopes from a plurality of frequency bands;
a comparison unit that compares a characteristic parameter of the input voice with the characteristic parameter of the given voice contained in the registration information stored in the storage unit if the judgment unit judges that the input voice is appropriate; and
a notification unit that notifies a speaker of the input voice if the judgment unit judges that the input voice is inappropriate.

4. The voice processing apparatus according to claim 3, wherein the judgment unit judges whether the input voice is appropriate or not, based on at least one of a quantity of the input voice, a time length of the input voice and a level of noise contained in the input voice.

5. A machine readable medium containing a program executable by a computer for performing the following steps, the computer having a storage that stores registration information containing a characteristic parameter of a given voice:
a judgment step of judging whether an input voice is appropriate or not for creating or updating the registration information when the input voice is acquired, based on a degree of a difference between an inter-band correlation matrix of the input voice acquired this time and an inter-band correlation matrix of another input voice that is judged as being appropriate last time, wherein elements of both inter-band correlation matrices include correlation values of envelopes from a plurality of frequency bands;
a management step of creating or updating the registration information based on a characteristic parameter of the input voice if the judgment step judges that the input voice is appropriate; and
a notification step of notifying a speaker of the input voice if the judgment step judges that the input voice is inappropriate.

6. A machine readable medium containing a program executable by a computer for performing the following steps, the computer having a storage that stores registration information containing a characteristic parameter of a given voice:
a judgment step of judging whether an input voice is appropriate or not for checking against the given voice when the input voice is acquired, based on a degree of a difference between an inter-band correlation matrix of the input voice acquired this time and an inter-band correlation matrix of another input voice that is judged as being appropriate last time, wherein elements of both inter-band correlation matrices include correlation values of envelopes from a plurality of frequency bands;
a comparison step of comparing a characteristic parameter of the input voice with a characteristic parameter of the given voice contained in the registration information stored in the storage if the judgment step judges that the input voice is appropriate; and
a notification step of notifying a speaker if the judgment step judges that the input voice is inappropriate.

* * * * *